(12) United States Patent
Lekel

(10) Patent No.: US 8,146,060 B2
(45) Date of Patent: Mar. 27, 2012

(54) DATA PROCESSING SYSTEM AND METHOD FOR EXECUTION OF A TEST ROUTINE IN CONNECTION WITH AN OPERATING SYSTEM

(75) Inventor: Reinhard Lekel, Muehldorf (DE)

(73) Assignee: Oce Printing Systems GmbH, Poing (DE)

( * ) Notice: Subject to any disclaimer, the term of this patent is extended or adjusted under 35 U.S.C. 154(b) by 1205 days.

(21) Appl. No.: 11/868,672

(22) Filed: Oct. 8, 2007

(65) Prior Publication Data
US 2008/0086720 A1    Apr. 10, 2008

(30) Foreign Application Priority Data
Oct. 10, 2006    (DE) .......... 10 2006 047 979

(51) Int. Cl.
*G06F 9/44* (2006.01)
(52) U.S. Cl. ............ 717/125; 717/127
(58) Field of Classification Search ........... 717/124–135
See application file for complete search history.

(56) References Cited

U.S. PATENT DOCUMENTS
6,336,007 B1    1/2002 Sugisaki et al.
2004/0249934 A1    12/2004 Anderson et al.

FOREIGN PATENT DOCUMENTS
DE    10 2004 006 951    12/2004
EP    0 093 242    11/1983

OTHER PUBLICATIONS
IBM, "e-Business Intelligence: Leveraging DB2 for Linux on S/390", Jul. 2001, IBM Corporation, pp. i-xii, 1-210.*
SuSE, "SuSE Linux Desktop—Administration Guide", 2003, SuSE Linux AG, 223 pages.*
Balzer et al., "SUSE LINUX Retail Solution 8 (SLRS 8) Admin Guide", May 2006, SuSE Linux AG, 162 pages.*

* cited by examiner

Primary Examiner — Ted T Vo
(74) Attorney, Agent, or Firm — Schiff Hardin LLP

(57) ABSTRACT

In a system or a method for execution of a test routine in connection with a test operating system, the program data for provision of an administration operating system is processed. The test operating system or system configuration specified by a list entry is determined under the provided administration operating system with aid of a list with test operating systems for system configurations to be automatically provided in series. The specified test operating system or system configuration is determined while the administration operating system is provided. Program data for provision of the determined test operating system or system configuration are processed. At least one test routine is executed that is executed automatically by the provided test operating system.

19 Claims, 4 Drawing Sheets

Batch processing of the test system for software products in connection with various operating systems, operating system configurations as well as operating system updates

| OS | Next OS | Action | Parameter | Comments |
|---|---|---|---|---|
| COS | 32_304_1 | load | 32_304 | Load the TOS image 32_304 and boot 32_304_1 |
| 32_304_1 | 32_304_1 | update | | Get all new 32-bit updates and boot 32_304_1 |
| 32_304_1 | CONTINUE | test | apa | Implement the apa-Tests and remain in 32_304_1 |
| 32_304_1 | 32_304_2 | test | pod | Implement the pod-Tests and boot 32_304_2 |
| 32_304_2 | COS | test | apa. | Implement the apa-Tests and boot COS |
| COS | CONTINUE | save | 32_304 | Save the TOS image 32_304 and boot into COS |
| COS | 32_310_1 | load | 32_310 | Load the TOS image 32_310 and boot 32_310_1 |
| 32_310_1 | 32_310_1 | update | | Get all new 32-bit updates and boot 32_310_1 |
| 32_310_1 | 32_310_2 | test | all | Implement all tests and boot 32_310_2 |
| 32_310_2 | COS | test | all | Implement all tests and boot COS |
| COS | CONTINUE | save | 32_304 | Save the TOS image 32_310 |
| COS | STOP | report | | Generate a test report |

TOS=Test operating system
COS=Administration operating system

Fig. 3

DATA PROCESSING SYSTEM AND METHOD FOR EXECUTION OF A TEST ROUTINE IN CONNECTION WITH AN OPERATING SYSTEM

BACKGROUND

The preferred embodiment concerns a data processing system as well as a method for execution of a test routine in connection with an operating system. The program data for initialization of the operating system are processed and the test routine is executed. It can thereby in particular be checked whether an application program interacts with the operating system without error.

Modern operating systems such as, for example, the operating system Microsoft Windows XP as well as various Linux distributions (for example the Linux distribution SUSE put out by the company Novell) have an integrated function for updating the respective operating system as well as application programs provided with the operating system. Examples for such application programs are web browsers, file administration programs and system programs. Depending on the configuration of the operating system, this also comprises network administration programs, video and audio recording and playback programs, programs for storage of data on data media etc. An updating of the mentioned operating system Microsoft Windows XP is possible, for example, via the Microsoft internet site. Important updates can be retrieved via this Internet site, which can be called up via a browser program. Given a corresponding default setting, modern operating systems such as Microsoft Windows XP additionally have the further possibility to automatically install updates of the operating system. However, given an activation of this automatic update function the danger exists that application programs will no longer function or will no longer function without error after an update of the operating system. For this reason various publishers release the application programs marketed by them only for specific operating system updates or operating system version states. In particular given use of data processing systems in a production process, an error-free function of the application programs to be executed under an operating system is indispensable for a friction-free production workflow. Examples for such production workflows are, for example, the administration of print jobs in a printing center as well as the controlling of print and processing processes of a printing path.

From the document EP 0093242 A it is also known to implement various tests to monitor machine functions of an electrophotographic copier machine.

SUMMARY

It is an object to specify a data processing system via which it can be checked in a simple manner whether an application program can be executed without error under a specific operating system or an operating system configuration.

In a system or a method for execution of a test routine in connection with a test operating system, the program data for provision of an administration operating system is processed. The test operating system or system configuration specified by a list entry is determined under the provided administration operating system with aid of a list with test operating systems for system configurations to be automatically provided in series. The specified test operating system or system configuration is determined while the administration operating system is provided. Program data for provision of the determined test operating system or system configuration are processed. At least one test routine is executed that is executed automatically by the provided test operating system.

BRIEF DESCRIPTION OF THE DRAWINGS

FIG. 3 is a list with successive test operating systems to be executed in succession and test operating system configurations to be executed in succession.

DESCRIPTION OF THE PREFERRED EMBODIMENT

Figure 1:
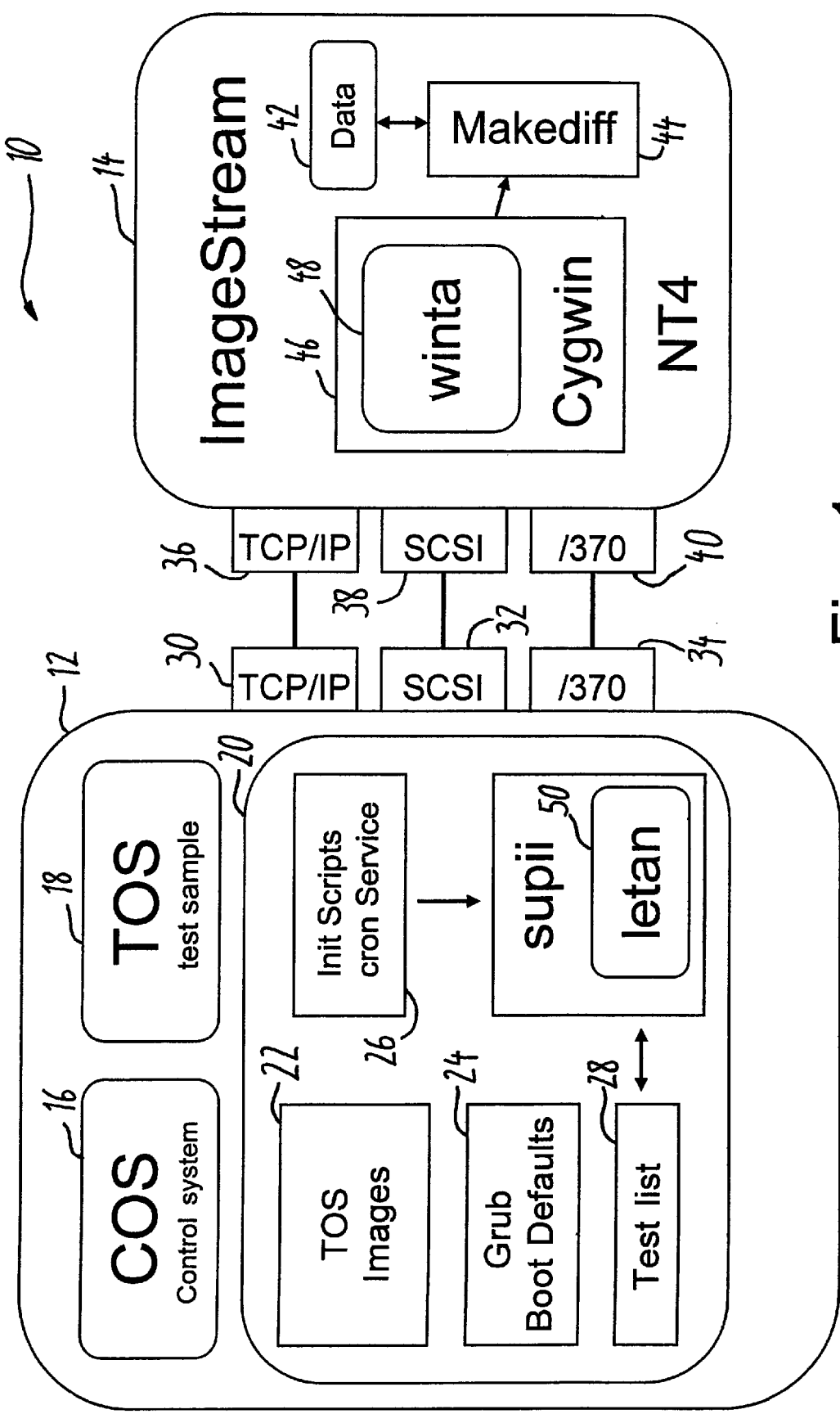
FIG. 1 is a block diagram of an overall system for testing of the print server function of a data processing system in connection with a printing simulation system.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

Via the data processing system, it is possible to automatically provide or initialize test operating systems or test operating system configurations cited in succession in a list, whereby at least one test routine can be executed automatically under the provided test operating system. Function errors in the interaction between the test operating system and an application program or an application software as well as from peripheral apparatuses connected with the data processing system can thereby be determined. The error-free functionality of an application software can thus be determined in a simple manner with suitable test functions in connection with a test operating system. The invention offers particular advantages when a plurality of different test operating systems and/or test operating system configurations are automatically provided in series with a respective application program (advantageously the same application program) or with a respective plurality of different application programs, whereby one (advantageously the same) test routine is respectively executed.

The test routine can, for example, retrieve as an application program a program via which the data processing system provides a print server function. The test routine can also process print data into a print data stream and transfer it to a test system connected with the data processing system. The test system generates at least one raster image with the aid of the transferred print data and advantageously compares this raster image with a stored raster image. The comparison result can thereby be transferred to the test routine, which thereby receives information about the comparison result or about a successful test.

In a development of the preferred embodiment, at least one test operating system in a first configuration and in at least one second configuration can be controlled and provided in succession by the administration operating system. The configuration is thereby advantageously established with the aid of at least one configuration parameter. For example, a data processing system can be configured as a 32-bit data processing system and as a 64-bit data processing system as well as for single processor operation or for dual-processor operation. Further configuration possibilities with activated and deactivated hardware components of the data processing system can also be preset as a configuration. Furthermore, at least two test operating systems can be successively provided that are controlled by the administration operating system corresponding to their list entries in the list. The list can thus contain both list entries for provision of various test operating systems and various configurations of a test operating system.

It is also advantageous when the administration operating system determines the test results of the at least one test routine and/or of the comparison as processable information and, if applicable, outputs the processable information in prepared form. The output information is advantageously stored in a file, transferred to a receiver as a message and/or output with the aid of an output unit. The message is in particular an e-mail message or an SMS message. It is also possible to only output test results when an error has occurred. A simple item of information to an operating personnel about the test results of the implemented test routine (in particular only given a negative test result) is thereby possible in a simple manner.

Given an advantageous development of the preferred embodiment, the test operating system is automatically ended after the execution of the test routine. The administration operating system subsequently automatically checks whether a further test operating system and/or a further test operating system configuration is to be started. An advantageous automatic workflow of tests with a plurality of test operating systems as well as with various test operating system configurations can thereby be implemented without user interventions being required for this.

It is also advantageous when under the administration operating system it is checked whether a test operating system contained in the list and/or a test operating system configuration contained in the list has not yet been provided. If such a test operating system or such a test operating system configuration is determined, the data processing system under the administration operating system is configured such that a not-yet-provided test operating system or a not-yet-provided test operating system configuration is automatically started after an automatic restart of the data processing system. The test operating system itself or an application program executed under the test operating system can thereby configure the data processing system. The automatic workflow of tests of a plurality of test operating systems and/or test operating system configurations in succession corresponding to the list entries can be implemented simply via the configuration of the data processing system.

It is also possible that a restart of the data processing system is initiated, during which the administration operating system is provided or executed. The restart is advantageously only initiated after the data processing system has been reconfigured, such that it provides a test operating system specified in the list or a test operating system configuration specified in the list after the restart of the data processing system. Furthermore, it is advantageous to initiate a restart of the data processing system during the execution of a test operating system and/or a test operating system configuration only after the test routine has ended or been interrupted. The test operating system or an application program executed under the test operating system stores information about at least one implemented test, advantageously in a file to which the administration operating system also has access when this is subsequently executed. The test operating system thereby configures the data processing system such that the administration operating system is provided after a restart initiated by the test operating system. The administration operating system and a test operating system or a test operating system configuration can thereby be provided in alternation in a simple manner.

The test operating system and/or the test operating system configuration are advantageously configured such that an updating of the respective test operating system is automatically implemented after its start when update data are available for updating of the program data of the test operating system. The test routine is advantageously started automatically only when the program data of the test operating system have been updated or program data of an application program to be executed under the test operating system have been changed, the functions of which the test routine accesses. It can thereby be tested in a simple manner whether program elements (in particular application programs) also function without error after an implemented updating of the test operating system. This is in particular necessary when an application program should be released for an updated version of an operating system. The administration operating system advantageously saves the program data of the updated test operating system after the test operating system has been ended. The updated version of the test operating system is thereby available for further tests. The updated test operating system can in particular be updated with further update data at a later point in time, whereby the test routine is then to be executed repeatedly. It can in particular be checked daily whether update data exist for a test operating system and/or a test operating system configuration. It can thereby be ensured that the most current version of a test operating system is always provided, such that the test routine is then executed under the most current version of the test operating system. This enables a malfunction of application programs and program elements due to an update of the operating system to be noticed quickly. If a malfunction is established, an update of the operating system of data processing systems at the client is advantageously prevented. This can, for example, occur in that the data processing system of the client is configured such that update data of the operating system are also only looked for on a server of the produced application software. Given an established malfunction, these update data are then not provided on this server. The update data for automatic updating of the operating system of a data processing system at the client are only provided when updated versions of an application program and/or of a program element can be provided that can be executed without error under the updated version of the operating system.

The test operating system configures the data processing system after the execution of the test routine, after an unsuccessful calling of the test routine or after a termination of the test routine such that the administration operating system is provided again upon a restart of the data processing system. The administration operating system can thereby subsequently further process the test results of the test routine executed under the test operating system as well as check whether a further test operating system or a further test operating system configuration should subsequently be provided.

For administration of the test operating systems and test operating configurations specified in the list, the data processing system can mark the list entry of a test operating system to be provided, of a provided test operating system, of a test operating system configuration to be provided or of a provided test operating system configuration as processed in the list or remove the list entry from the list. This can in particular be executed under the current provided operating system. A simple administration of the test operating systems and/or test operating system configurations executed and to be executed is thereby possible.

The configuration of the data processing system for execution of a test operating system or of the administration operating system after the restart is advantageously established with the aid of a boot manager. A simple configuration for selection of the operating system to be executed after the restart is thereby possible. In particular the configuration file of the boot manager can thereby be changed and/or exchanged.

It is also advantageous when the administration operating system or an application program or application program element execute under the administration operating system starts the execution of the list at a predetermined time. No intervention by an operating personnel is thereby necessary at the start of the test to be implemented. The tests can thereby be shifted into time periods in which the data processing system is not used or is only slightly used otherwise.

It is also advantageous when the data processing system comprises at least three storage regions. These storage regions are advantageously partitions. At least program data and/or application data for provision of an operating system (test operating system) required for testing are advantageously contained in the first storage region. The program data of at least one application program can also be stored in a first storage region, the functions of which application program are to be tested under the test operating system with the aid of the test routine. At least program data and/or application data for provision of the administration operating system are stored in a second storage region. At least program data and/or application data for provision of at least one test operating system are advantageously stored in a third storage region, with which test operating system the program data and/or application data required for provision of the test operating system in the first storage region can be generated. In particular the program data and/or application data required for provision of the test operating system in the first storage region can be generated with the aid of the data stored in the third storage region. These data are advantageously stored as an image (file system image) in the third memory region. An image is advantageously respectively generated for different test operating systems. Furthermore, an image can be stored in the third storage region for each combination of the test operating system and an application software to be tested in connection with this test operating system, whereby program data and/or application data can be generated as a test operating system and of the application program gradient echo generated in executable form in the first storage region with the aid of these image data. The application software can thereby comprise one or more program elements and/or application programs. An image is thereby an image of a storage region with which the data of the storage region can be reproduced and/or when this is desired.

A method for execution of a test routine in connection with a test operating system enables a simple, automated test workflow. Such a method can be developed in the same manner as the data processing system of the preferred embodiment. In particular, individual features of the preferred embodiment can be used for development of the method for execution of a transmission and reception antenna in connection with a test operating system, whereby the same advantages are achieved.

The test operating systems and the administration operating system are operating systems typically used in data processing systems. Such operating systems are the software that enables the use and the operation of a data processing system, in particular the execution of application software. They administer operating units such as storage, input and output devices and control the execution of programs. The operating systems typically comprise a kernel that administers the hardware of the data processing system. The operating systems also comprise fundamental system programs that provide functions for operation of the data processing system. Current operating systems used in connection with computers are Windows XP, Windows 2000, Windows Server 2003 from the company Microsoft Corporation, the operating system MacOS from the company Apple Corporation, the operating system Unix and the operating system Linux, for example in the distribution SUSE Linux Enterprise Server 9, SUSE Linux Enterprise Server 10 or SUSE Linux Professional 10 from the company Novell.

The block diagram of an overall system 10 for testing of print server functions of a data processing system 12 in connection with a printing simulation system 14 is shown in FIG. 1. The data processing system 12 is configured such that the administration operating system 16 and a test operating system 18 can be executed in alternating function. The administration operating system 16 in the present exemplary embodiment is SUSE Linux Enterprise Server Version 9. The images 22 of a plurality of test operating systems are stored in a storage region 20 of the data processing system 12. Basic settings 24 of a boot loader are also stored in a storage region 20. In the present exemplary embodiment the GRUB boot loader of the operating system SUSE Linux Enterprise Server 9 is used.

Also stored in the storage region 20 are various initialization scripts 26, of which at least a portion is executed with the aid of a temporal workflow control. A temporal workflow control is possible in the operating system SUSE Linux Enterprise Server 9 with the aid of the cron service. The points in time at which a script or a program should be called by the cron service are then entered into a list. In the operating system SUSE Linux Enterprise Server 9 this list is stored in the files CRON.TAB or, respectively, in the files CRON.HOURLY; CRON.DAILY; CRON.WEEKLY; or CRON.MONTHLY.

Furthermore, a test workflow list 28 is stored in the storage region 20, which test workflow list 28 comprises the test operating systems 18 to be executed in succession as well as the configurations of these test operating systems to be executed in succession and the possible application software required for the tests to be implemented and to be executed under these test operating systems test system configurations. While the administration operating system 16 is activated the data processing system 12 is configured with the aid of the scripts 26 and the cron service such that the next test operating system 18 listed in the test workflow list 28, which test operating system 18 is of the configuration specified in said list 28, is respectively loaded and thus provided after at least one restart of the data processing system 12. A test routine is respectively started after the start of the test operating system 18.

The printing simulation system 14 is a data processing unit that possesses at least the functional scope of a print controller of a high-capacity printer. The print controller in particular generates raster images on the basis of the supplied print data, with the aid of which raster images per-pixel image information can be provided to an image generation unit. The printing simulation system 14 can thereby process print data (that are advantageously supplied to the printing simulation system 14 as a print data stream) in the same manner as a print controller of a high-capacity printer. The printing simulation system 14 in particular generates raster images from the supplied print data and advantageously stores these in a suitable file format such as the Tagged Image File Format (TIFF/TIF). The generated image data are compared with stored image data 42. This comparison is implemented via an application program 44. Given deviations of the generated image data from the stored image data, this is established by the application program 44, whereby corresponding information about the test result are transferred to the data processing system 12.

As already mentioned, the printing simulation system 14 comprises a data processing system, advantageously a personal computer. The data processing system of the printing simulation system 14 thereby advantageously comprises plug-in cards that are inserted into a module carrier, whereby this data processing system has at least one processor plug-in card with at least one primary process (CPU). In the event that it is necessary, the computing capacity of the data processing system can be increased simply via the provision of a plurality of processor cards in the event that it is necessary. In the present exemplary embodiment, Windows NT 4 from the company Microsoft Corporation is used as an operating system of the printing simulation system 14. Under the operating system Windows NT 4, an application program 46 is started via which a Unix operating system environment is provided under the operating system Windows NT 4. The application program 48 is executed under this Unix operating system environment, which application program 48, with an application program 50 executed by the data processing system 12, establishes a secured data connection via one of the interfaces 30, 36 in order to control the test workflow in the printing simulation system 14 and to transfer the test results from the printing simulation system 14 to the data processing system 12.

In particular an application software (such as the software solution distributed under the designation Océ PRISMAproduction for the development of complex print jobs) can be comprehensively tested in connection with various operating systems and operating system configurations with the aid of the test arrangement shown in FIG. 1. The software solution PRISMAproduction enables an improved connection and compatibility in printing systems with high print volume. A maximum production security for these printing systems is thereby ensured given high process speed. The Océ PRISMAproduction software solution can also be used for the entire administration and common control function of document production systems at one or more sites as well as for central monitoring of print centers. Further software products such as Océ Prisma Satellite, Océ Document Manager, Océ Document Designer, Océ Copy Maker, Océ Doc Setter, Océ Professional Document Composer, Océ True Proof, Océ Prisma Net, Océ Prisma Audit and Océ Doc Works as well as any other software products of any producer can be tested in the same manner in connection with an operating system and/or an operating system configuration (test operating system/test operating system configuration). Both the function and the retrieval of the respective software product, the interaction of a plurality of software products as well as individual functions of the software products can thereby be tested.

For execution of such a test, the software product is started or the software products are started so that the programs and program elements required for the software products are executed. For execution of various function tests, a further application program is started that checks whether the individual program elements of the software components have been started correctly. Various function tests are subsequently initiated by the application program and the reactions of the software elements are recorded, whereby it is checked whether the reactions to the corresponding requirements are correct. In particular a print job is generated by the application program, which print job is supplied to the activated PRISMAproduction application software. With the aid of the print job the PRISMAproduction generates a print data stream that is transferred via a data connection (specified by the application program) from the data processing system 12 to the print production system 14 over the interfaces 30, 36; 32, 38; 34, 40.

Given correct processing of the print job by the PRISMAproduction application software and correct data transfer to the print production system 14, with the aid of the print data of the print job rastered print images are generated that, as already described, are compared with the aid of the image data stored in the printing simulation system 14.

If deviations exist between the generated image data and the stored image data 42, at least one software component executed by the data processing system 12 is not functioning correctly. Deviations of the image data in particular indicate a malfunctioning software element of an application program or an error of a software element in connection with the provided test operating system.

Before the implementation of the tests, the test operating system 18 is advantageously updated with the aid of update data. The update data are advantageously retrieved by the test operating system 18 via a network from a server of the producer or distributor of the test operating system. If it has already been ensured via preceding tests that the test operating system 18 itself interacts without error with the application programs of the software product, such that the printing simulation system 14 has established no deviations of the generated image data, the application program for testing of the software components is only executed when the test operating system 18 has been updated with the aid of update data. Otherwise the test operating system is ended without function testing of individual software elements. Before ending, the test operating system automatically configures the data processing system 12 such that the administration operating system 16 that is thereby provided is started after a restart of the data processing system 12.

Upon implementation of the function testing of the software product, the test results are stored in a file in a storage region of the data processing system 12 to which the administration operating system 16 also has access upon a subsequent restart. If, as described, no function test is implemented since in particular no updating of the test operating system has occurred or the software element to be tested could not be started, this information is likewise stored in a file to which the administration operating system 16 also has access.

Figure 2:
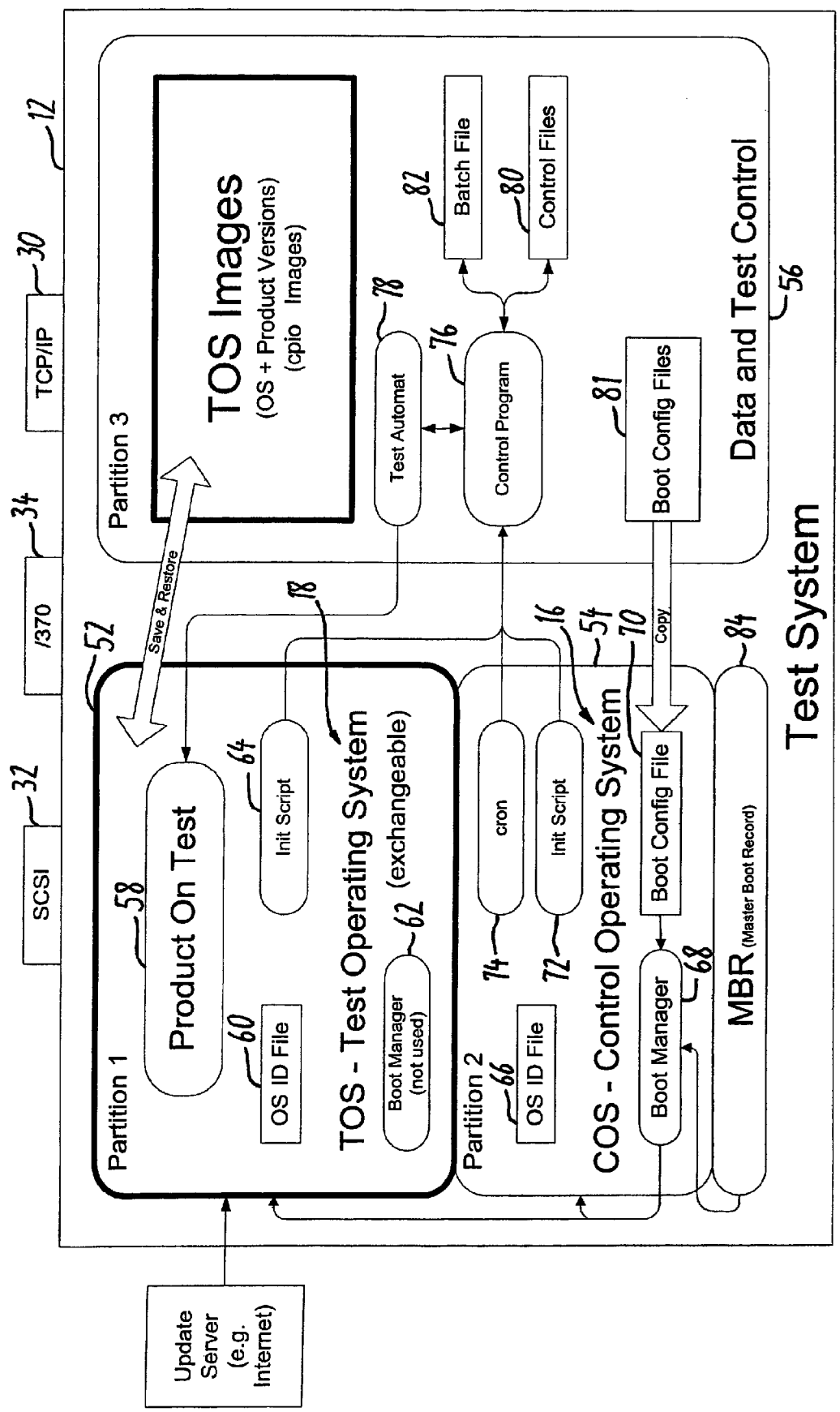
FIG. 2 is a block diagram of the data processing system according to FIG. 1 with elements for implementation of the required tests.

A block diagram of the data processing system 12 according to FIG. 1 is presented in detail in FIG. 2 with elements for testing of the function of at least one application software in connection with a test operating system. A non-volatile memory of the data processing system 12 (in particular a fixed disk storage) has at least three partitions 52, 54 and 56. Program data for providing the test operating system 18 as well as program data 58 of an application software to be tested in connection with the test operating system are stored in the first partition 52. The first partition 52 furthermore comprises an OS ID file 60 that contains information about the version of the provided test operating system 18. The test operating system 18 comprises a boot manager 62 that is, however, deactivated, or alternatively automatically starts the test operating system stored in the first partition 52. Also stored in the first partition 52 is a program element (what is known as an init script 64) with whose help the control program 76 and the program element 58 to be tested are automatically started after the initialization of the test operating system 18.

The second partition 54 comprises program data of the administration operating system 16, an OS ID file 66 with information about the operating system version of the administration operating system 16, program data of a boot manager 68, a boot config file 70 with configuration data for configuration of the boot manager 68, an init script 72 with instructions to be automatically executed after the initialization of the administration operating system 18 and program data of a cron service 74 for time-controlled calling of instructions as well as of further program elements.

The third partition 56 comprises data with images of a plurality of test operating systems 18 and a plurality of configurations of these test operating systems 18, which configurations differ from one another. Also stored in the third partition 56 are program data of a control program 76, program data of a test automaton application program 78 as well as control files 80 and batch processing files 82 (batch files). Also stored in the third partition 56 are a plurality of files 81 with various configuration data for configuration of the boot manager 68, i.e. a plurality of what are known as boot config files that are used by the administration operating system 16 and the test operating system 18 in order to replace the boot config file 70 used for configuration of the boot manager 68.

The fixed disk storage of the data processing system 12 or a suitable other non-volatile memory also comprises a storage region that is designated as a master boot record 84. At least one storage address that is read by a processing unit of the data processing system 12 is specified in this master boot record 84. With the aid of the read storage address, the program data stored at this storage address are read and executed by the data processing system 12. In the present case the program data of the boot manager 68 is called and executed.

Dependent on the configuration data of the boot config file 70, after a start of the data processing system 12 the boot manager 68 automatically executes the test operating system 18 stored in the first partition 52 or the administration operating system 16 stored in the second partition 54. In the initial state the administration operating system 16 is executed.

The processing of the list (test workflow list) contained in a batch processing file 82 with test operating systems and test operating system configurations to be provided in succession is started with the aid of the cron service 74. The administration operating system 16 checks whether a test operating system to be provided or a test operating system configuration to be provided is specified in this list. If that is the case, the administration operating system 16 determines the image stored in the third partition 56 with regard to this test operating system or with regard to this test operating system configuration and completely overwrites the first partition 52 with the program data and/or application data contained in the image. Program data of operating systems to be tested, including further application programs and possibly a required test routine, can be inserted into the first partition 52 in a simple manner with the aid of these images, whereby a defined program environment and an executable operating system can be provided simply via the replacement of the entire first partition 52.

Information of in which configuration the test operating system 18 stored in the first partition 52 is started can also be comprised in the boot config file 70. This information in particular comprises the specification of whether the test operating system 18 is started with one processor or with two processors. Further boot options can be established with the aid of the boot config file 70.

With the aid of the OS ID file 60, 66, an application program executed under the respective provided operating system (administration operating system or test operating system) can determine information about the currently provided operating system. The control program 76 can thus detect the identity of the currently-booted operating system. The cron service 74 of the administration operating system 16 starts a test cycle to be processed, advantageously once per day. After the start of the test cycle the administration operating system 17 determines the next combination of a test operating system and a software product to be tested, which combination is contained in the list. This software product is also designated as a product on test. An image is stored in the third partition for each combination of a test operating system and a software product to be tested. The software product 58 to be tested in connection with the test operating system 18 is automatically started and executed by this after the start of the test operating system 18. Further function tests of the software product 58 can subsequently be implemented, as already described in detail in connection with FIG. 1. The test workflow can be controlled with the aid of the batch processing files 82. Information about the implemented tests can be cached in the control files 80.

A possible exemplary test workflow is subsequently described. After the start of the data processing system 12 the administration operating system 16 is started and provided with the aid of the boot manager 68. As already stated, the administration operating system 16 is a SUSE Linux Enterprise Server Distribution of the version 9 in which the cron service 74 for chronological workflow control is started and active. At a time preset in the cron service, for example at 1:00 AM, a program that creates a batch processing file 82 with a list of instructions to be successively executed for the test workflow and at least one control file 80 is automatically started by the cron service. The control program 76 which controls the further workflow is also started. The control program 76 reads a line of the batch processing file 82 and executes the instructions specified by this line. For example, via this line it is specified that the data of an image of an operating system stored in the third partition 56 and of a software product to be tested should be loaded into the first partition 52 so that a software system to be tested is provided in the first partition. The boot config file 70 is also replaced with a stored boot config file 81, whereby the boot manager 68 starts and initializes the operating system contained in the first partition 52 upon a subsequent start of the data processing system 12. After the control program 76 has reestablished the selected image in the first partition 52 and has provided a suitable boot config file 70 to the boot manager 68, it deletes the current line of the batch processing file 82 and implements an automatic restart of the data processing system 12.

After the restart of the data processing system 12 the boot manager 68 of the administration operating system 16 is called via a corresponding entry in the master boot record 84. The test operating system 18 contained in the first partition 52 is subsequently started since this test operating system 18 is specified in the boot config file 70 as a default operating system that is started when no further operator interventions occur. The init script 64 is automatically executed after the start of the test operating system 18. The control program 76 is automatically started with the aid of the init script 64. The control program 76 accesses the previously-created control file 80 and learns via the information stored in the control file 80 that the data processing system 12 is located in an automatic test run and the batch processing file 82 is to be processed. The current first line of the batch processing file 82 is thereupon processed. For example, this line can contain the instruction that an updating of the test operating system 18 is to be implemented. As already described, the test operating system 18 can access a server via a network (such as the Internet) for this and there search for suitable update data. If the server contains update data, these are transferred to the test operating system 18 and the test operating system 18 is updated with the aid of these update data. The first line of the batch processing file 82 is erased both after a successful update and when no update data are present on the server. In the event that it is necessary, a restart of the data processing system 12 is subsequently implemented in order to conclude the update of the test operating system 18. After this restart the test operating system 18 is automatically started and initialized again, whereby the init script 64 and the control program 76 are started in the same manner. The information that a test should be implemented is henceforth contained in the first line of the batch file 82. The test workflow is controlled by the control program 76. After the test has been implemented, an image of the first partition 52 is subsequently generated with the aid of the control program 76, whereby the data of the image are stored in the third partition 56.

On the next day this image is then loaded as an image for testing of the software product 58 together with the test operating system 18. On the next day it is checked again whether new update data exist for updating of the test operating system 18. For implementation of the testing of the software product 58 in connection with the test operating system 18, the control program 76 calls the test automaton application program 78 given whose execution predetermined tests of the software product 58 are implemented. Various software products 58 to be tested can also be loaded and executed in succession with the aid of the test automaton software product, whereby then suitable tests of the software product are respectively implemented. What are known as log data regarding each test are generated by the test automaton application program 78 and stored in a corresponding log file. The control program 76 combines the generated log data into a common log file, such that only one log file is generated for each test run. The control program 76 replaces the boot config file 70 with a suitable stored boot config file 81, such that given subsequent restart of the data processing system 12 the administration operating system 16 is started by the boot manager 68 and thus automatically provided.

After a restart of the data processing system 12 the administration operating system 16 is restarted and the init script 72 is processed (as already described) and the control program 76 is started. The control program 76 reads the now first line of the batch processing file 62 and processes the instructions contained therein. A further image can be read from the third partition 56 and can be stored in the first partition 52 with the aid of these instructions. All operating system and application data stored in the first partition are thereby overwritten by the data contained in the image. After a further change of the boot config file 70 and a subsequent restart of the data processing system 12, the test operating system now stored in the first partition 52 is started and the instructions of the init script 64 are processed. Update data for the test operating system 18 are thereby determined and, when these could be determined, the test operating system 18 is updated. This updating and the subsequent testing of the software product 58 or various software products 58 in connection with the test operating system 18 occurs in the same manner as already described for the first test operating system of the first loaded image. After the execution of the tests or after a termination of the tests, the administration operating system 16 is again started via a corresponding manipulation of the boot config file 70. The init script 72 and the control program 76 are subsequently started again. If the control program 76 determines that the batch processing file 82 contains no further instruction lines, the test workflow is ended. The administration operating system 16 thereupon generates a message (advantageously an e-mail message) with the test results and transfers this to a predetermined recipient. The administration operating system 16 remains active until the time controller 74 restarts the entire workflow at 1:00 AM the next morning. A new batch processing file 82 with instructions about tests to be implemented is thereupon automatically generated and the workflow is automatically executed again.

The content of the batch processing file 82 is exemplarily presented in FIG. 3 after its generation. For generation of the batch processing file 82 a corresponding file with a predetermined file name is stored at the predetermined storage location 50. At least the content of the batch processing file 82 is advantageously copied from a data source such as, for example, another file or another directory.

The header line of the batch processing file 82 is not contained in the actual batch processing file 82 or is designated as a comment line so that it is not considered as a first line for the workflow. The combination of the respective test operating system 18 to be loaded and the software product 58 to be tested as well as the boot configuration to be executed are respectively specified in the first column. Which operating system or which combination of test operating system 18 and software product 58 to be tested is subsequently to be loaded in which boot configuration is specified in the second column. The action to be implemented is specified in the third column and a parameter is specified in the fourth column. Additionally at each line a comment is also indicated via which the actions to be implemented are specified by the control program 76 based on the information contained in the respective line. In the event that the operating system combination specified in the first column is presently not executed, with the aid of the control program 76 the boot config file 70 is manipulated such that the operating system specified in the first column of the first line or the specified combination of operating system and software product is started and activated after a subsequent restart. The designations of the current operating system and of the next operating system to be loaded that are contained in the first column coincide with the designation of the boot config files 70 (which are required for execution) that are stored in the storage region 81. The respective designation contained in the second column (Next OS) indicates which operating system should be booted (i.e. started) after processing of the line. Before the reboot (restart of the data processing system) the current line is deleted. The designation CONTINUE means that it is not rebooted, meaning that no other operating system or no other combination is to be loaded for the actions specified in the next line in the following list entry. The current line is also erased then. The name of the images to be loaded are defined as follows in the specified exemplary embodiment:

32_304  32 Bit SUSE Linux Enterprise Server 9 with PRISMAproduction V 3.04;
32_310  32 Bit SUSE Linux Enterprise Server 9 with PRISMAproduction V 3.10;
64_304  64 Bit SUSE Linux Enterprise Server 9 with PRISMAproduction V 3.04;
64_310  64 Bit SUSE Linux Enterprise Server 9 with PRISMAproduction V 3.10.

In the present exemplary embodiment the following naming conventions are also established for the boot config files 81:

| | |
|---|---|
| 32_304_1 | 32 Bit SUSE Linux Enterprise Server 9 with PRISMAproduction V 3.04 with one CPU; |
| 32_304_2 | 32 Bit SUSE Linux Enterprise Server 9 with PRISMAproduction V 3.04 with two CPUs; |
| 32_310_1 | 32 Bit SUSE Linux Enterprise Server 9 with PRISMAproduction V 3.10 with one CPU; |
| 32_310_2 | 32 Bit SUSE Linux Enterprise Server 9 with PRISMAproduction V 3.10 with two CPUs; |
| 64_304_1 | 64 Bit SUSE Linux Enterprise Server 9 with PRISMAproductionV 3.04 with one CPU; |
| 64_304_2 | 64 Bit SUSE Linux Enterprise Server 9 with PRISMAproduction V 3.04 with two CPUs; |
| 64_310_1 | 64 Bit SUSE Linux Enterprise Server 9 with PRISMAproductionV 3.10 with one CPU; |
| 64_310_2 | 64 Bit SUSE Linux Enterprise Server 9 with PRISMAproduction V 3.10 with two CPUs. |

The first line of the batch processing file 82 shown in FIG. 3 specifies that the administration operating system 16 (COS) is executed, that the image 32_304 is to be loaded next and that the boot config file 70 is to be replaced by the boot config file with the designation 32_304_1. The test operating system 18 (SUSE Linux Enterprise Server 9) loaded into the first partition 52 is thereby subsequently started as a 32-bit operating system with one processor and the software product 58 (PRISMAproduction 3.04) is executed.

The second line of the batch processing file 82 specifies that all new 32-bit updates are to be determined and loaded and that the same operating system should be started in the same configuration after the update or when no update data could be determined.

The third line specifies that the 32-bit operating system SUSE Linux Enterprise Server 9 is executed in connection with the software product 58 PRISMAproduction V 3.04 in the single-processor configuration, that the tests under the designation apa-Tests are implemented and that no restart occurs after these tests; rather, the test operating system is provided further.

The fourth line specifies that the current operating system to be executed is the 32-bit SUSE Linux Enterprise Server 9 operating system in the single-processor configuration and the software product 58 is PRISMAproduction V 3.04. The pod-Tests are thereby to be implemented and the boot config file 32_304_2 is to be executed after a restart, whereby the test operating system 18 contained in the first partition 52 is to be started in a two-processor configuration together with the software product 58 PRISMAproduction V 3.04.

The line 5 specifies that the 32-bit operating system SUSE Linux Enterprise Server 9 is executed in a two-processor configuration together with the software product 58 PRISMAproduction V 3.04. The test automaton application program 78 should also implement the apa-Tests and subsequently start the administration operating system 16 via a corresponding manipulation of the boot config file 70.

The sixth line specifies that the administration operating system 16 is currently executed and that an image of the first partition is generated and stored as an image file in the third partition 56 under the designation 32_304. The administration operating system 16 is subsequently retained upon a restart.

The seventh line specifies that the administration operating system 16 is currently executed and that the image with the designation 32_310 is loaded into the first partition 52, such that the first partition 52 then contains program data of the 32-bit SUSE Linux Enterprise Server 9 operating system in a 32-bit version [sic] as well as the program data of the software product 58 PRISMAproduction V 3.10. This operating system should subsequently be started in a single-processor configuration.

The eighth line specifies that the 32-bit operating system SUSE Linux Enterprise Server 9 is executed in a single-processor configuration together with the software product 58 PRISMAproduction V 3.10 and that update data are determined with which this operating system is updated. The operating system SUSE Linux Enterprise Server 9 is subsequently started as a 32-bit operating system with one processor and implemented as a test. After a restart the 32-bit operating system SUSE Linux Enterprise Server is started in a two-processor configuration and all tests are implemented. The administration operating system is subsequently started.

The eleventh line specifies that the administration operating system 16 is currently executed and the administration operating system 16 should be executed again as a subsequent operating system. An image of the first partition 52 should also be generated and stored under the designation 32_310 in the third partition 56.

The twelfth line specifies that currently the administration operating system 16 is executed and that the workflow is not continued. The instruction is also provided that a test report is generated.

Figure 4:
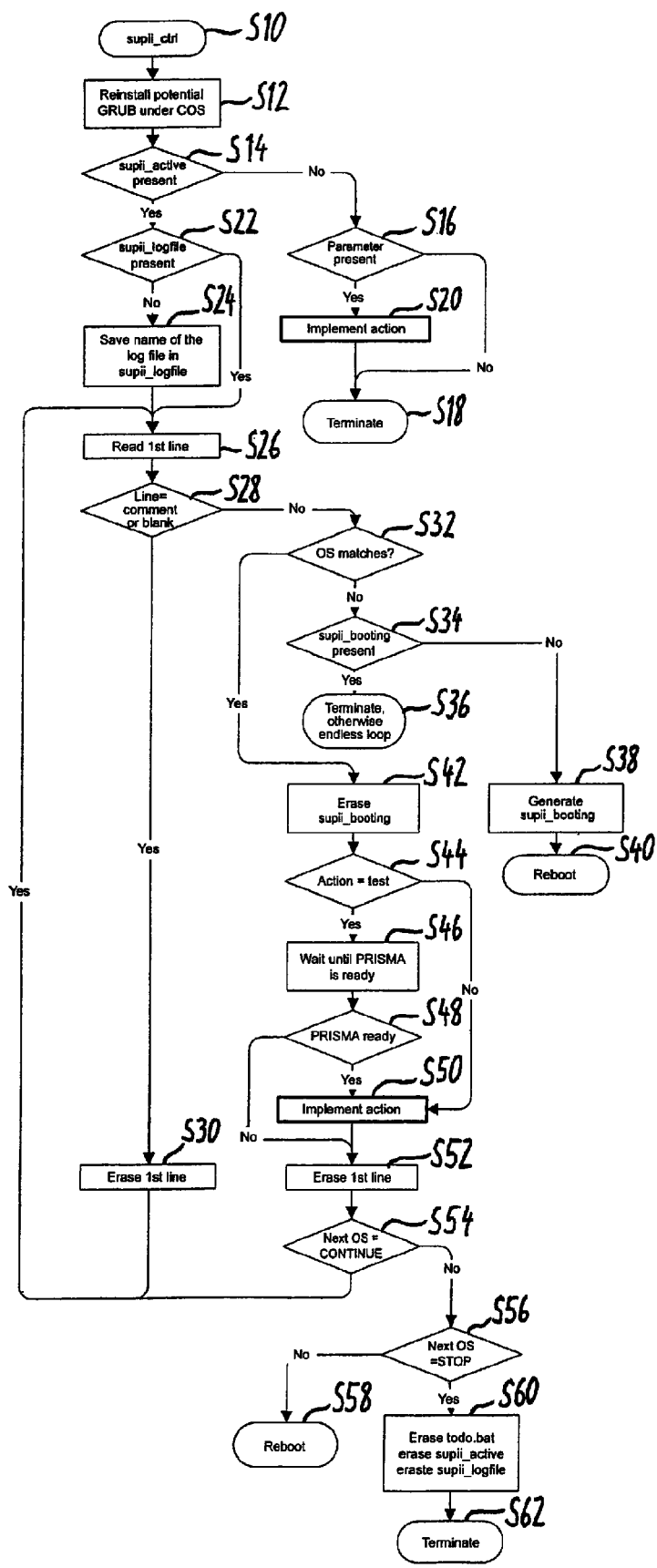
FIG. 4 is a workflow plan for execution of a test routine in connection with a list with a plurality of test operating systems and test operating system configurations.

A workflow diagram of the workflow controlled by the control program 76 is shown in FIG. 4. This workflow program is also designated as a SUSE Update Initiation Inspector and is abbreviated with the letters supii in FIG. 1. The workflow is started in step S10. In step S12 it is subsequently checked whether an update of the boot manager 62 has been installed in a preceding update of the operating system stored in the first partition 52, via which boot manager 62 a reference to the boot manager 62 of the test operating system 18 has been entered into the master boot record 84. The boot manager 62 in the test operating system SUSE Linux Enterprise Server 9 used in the preceding exemplary embodiment has such a boot manager 62 (designated GRUB). If that is the case, the entry in the master boot record 84 is changed so that the boot manager 68 of the administration operating system 16 is active after a subsequent restart.

It is subsequently checked whether a control file 80 is present via which it is specified that the data processing system is located in a test workflow for testing of at least one test operating system 18 in connection with a software product 58. After the start of the test workflow via the cron service 74 this is also created as a control file 80 as a file designated as supii_active [sic]. For example, this control file 80 can also be removed via a user intervention, whereby the test workflow is interrupted. Alternatively, the test workflow can be started not by the cron service 74 but rather manually via a user intervention. The control file supii_active is then also not present. If it is established in step S14 that the control file 80 supii_active is not present, in step S16 it is subsequently checked whether test parameters are available in a further control file 80 or in a batch processing file 82. If that is not the case, the workflow is ended in a step S18. If parameters for specification of the tests to be implemented are present in a control file 80 or in a batch processing file 82, the actions so specified are implemented in step S20, whereby the workflow is ended in a subsequent step S18.

However, if it is established in step S14 that the control file 80 supii_active is present, in a step S22 it is subsequently checked whether a supii_logfile is present. The entire test workflow controlled by the control program 76 is protocolled in this log file. If it is established in a step S22 that such a supii_logfile is not present, in a step S24 such a log file is subsequently generated and stored in the third partition 56.

After the saving of the supii_logfile or if it is established in step S22 that such a supii_logfile is already present, the first line of the batch processing file 82 with the name todo.bat is subsequently read in a step S26. In a step S28 it is subsequently checked whether the line is a comment line or a blank line. If this is the case, in a step S30 the comment line or the blank line is subsequently erased and the workflow is continued in step S26 until it is determined in step S28 that the read first line is neither a comment line nor a blank line. The workflow is then continued in a step S32.

In step S32 it is checked whether the current operating system provided by the data processing system 12 coincides with the operating system specified in the first column of the first line. In particular the OS ID file 60 or 66 of the current executed operating system 18 or 16 is read out for this and this information is compared with the operating system specification of the first column. If the currently provided operating system does not coincide with that by the list entry in the first column of the first line, in step S34 it is subsequently checked whether a file supii_booting is stored as a control file 80 in the third partition 56. If this is the case, the workflow is ended in step S34 since then the system has already been restarted again (i.e. has been booted) without the correct operating system being started and initialized. If it is established in step S34 that the file supii_booting is not present, in step S38 a file supii_booting is subsequently generated and a boot config file associated with the operating system specified in the first column of the first line is selected from the boot config files 81 and stored as a boot config file 70 so that the boot manager 68 starts and initializes the desired operating system upon a subsequent restart of the data processing system 12. A restart of the data processing system 12 is subsequently implemented and the workflow is continued in step S10 after the restart. However, if it is established in step S32 that the currently provided operating system coincides with the operating system specified in the first column of the first line of the file todo.bat, the file supii_boot is erased in step S42. In step S44 it is subsequently checked whether a test (in particular a function test of functions provided by the application software 58) is to be executed as an action in the first line. If this is the case, in a step S46 the workflow subsequently waits until the application program PRISMAproduction to be tested has been restarted as a software product 58 to be tested and its function is made available.

In a step S48 it is subsequently checked whether the software product 58 PRISMAproduction is operational. If this is the case, or if it is established in step S44 that the action to be executed is not a test, in step S50 the action specified in the first line is subsequently implemented. Subsequently, or if it is established in step S48 that the software product 58 PRISMAproduction is not ready, the first line is erased in step S52. In step S54 it is subsequently checked whether CONTINUE is specified as a next operating system to be executed, whereby the presently provided operating system is retained without restarting. If this is the case, the workflow is continued in step S26.

However, if it is established in step S54 that the presently-provided operating system should not be retained, the workflow is continued in step S56.

In step S56 it is then checked whether the designation Stop is contained in the second column of the current line. If this is the case, the test workflow is ended and in step S60 the batch file todo.bat as well as the control files supii_active and supii_logfile are subsequently deleted. The workflow is subsequently ended in step S62. If it is established in step S56 that a designation other than Stop is contained in the next column (NEXT OS), a boot config file associated with the entry in the second column is subsequently selected from the boot config files 81 and stored as a boot config file 70, such that the boot manager 68 starts the desired operating system in the specified configuration upon a subsequent restart of the data processing system 12 in step S58.

When the file supii_active is present, via the presence of the file it is thus indicated that the automatic test workflow (i.e. a test workflow in batch processing mode) is running in which the list entries of the file todo.bat are processed in succession. An endless restarting of the data processing system 12 without the test workflow being executed is prevented via the generation of the file supii_booting. This is in particular reasonable given an inaccurate batch processing list in order to not boot the data processing system unnecessarily often, i.e. to not start said data processing system unnecessarily often. With the aid of the file supii_grubrepair the boot manager 68 of the administration operating system 16 can be reinstalled and a corresponding entry can be generated in the master boot record 84. The file supii_logfile contains the names of a current constructed log file. The file supii_protfile contains the file names of a protocol file to be generated.

As already mentioned in connection with FIG. 3, after an implemented update of the test operating system an image of the entire first partition 52, including the program data of the test operating system and of the respective software product 58 as well as further applications and program data, is generated and stored as an image in the third partition 56. This image can be executed with the function CPIO, for example under the operating system Linux. Such an image can, for example, be generated as a backup via the following commands.

cd /mnt/root_os
find .-depth -print|cpio -ov -H crc|gzip -c>/s/images/root_os.cpio.gz As already mentioned, such a generated image can be stored in the third partition 56 and be imported again into the first partition 52 for subsequent tests, i.e. be cached in the first partition 52, whereby data of the same programs and application data as upon the preceding saving of these data are present in the first partition 52. The image can, for example, be transferred from the third partition 56 into the first partition 52 with the following instructions.

cd /mnt/root_os
gunzip -c</s/images/root_os.cpio.gz|cpio -ivmud

The preferred embodiment was exemplarily described with the operating systems SUSE Linux Enterprise Server 9 as an administration operating system and in various variations as a test operating system. However, both the administration operating system 16 and the test operating systems 18 can be used by other operating systems such as, for example, Microsoft Windows operating systems in various versions, Unix operating systems, MacOS or other known or future operating systems. In particular various test operating systems can be tested in succession with various software products. A plurality of software products 58 can thereby be tested simultaneously or in succession with one test operating system.

It is also possible to start the test operating systems in series or in parallel on various virtual machines in a virtual environment, whereby the administration operating system is advantageously the base operating system that enables a virtual environment for initialization of a plurality of virtual machines with the aid of an application program. Such an application program is, for example, known under the designation VMware from the company VMware Corporation or under the designation XEN that accompanies current SUSE Linux distributions. Any other virtual environment can also be used in the same manner.

It is particularly advantageous when an automated test method comprises a portion of the following method steps that are automatically executed:

checking whether update data for updating of the operating system (update data or patch data) are available downloading of the update data, advantageously from a server restart of the operating system in order to ensure that all updates are activated comprehensive tests of an application software (for example PRISMAproduction) with the updated operating system repetition of the preceding steps for various operating systems or operating system versions If print data or print data streams are generated in the tests, these can be output via various interfaces that can also be realized as software. These interfaces can be direct interfaces, Océ SPS CIS, Océ SPS, IBM ACIF or IBM PSF interfaces.

Time-out monitoring systems can be provided for some workflow steps for implementation of the test workflow, via which time-out monitoring systems the test workflow is interrupted given a time overrun of a predetermined time. A central termination function (central exit code) can also be evaluated. Additionally or alternatively, a central error handling can also be provided via which, for example workflows steps in which an error has occurred are repeated.

The preferred embodiment is in particular suitable to be realized as a computer program (software). It can therewith be distributed as a computer program module as a file on a data medium (such as a diskette, DVD-ROM or CD-ROM) or as a file via a data or communication network. Such comparable computer program products or computer program elements are embodiments of the invention. The workflow of the preferred embodiment can be used in a computer, in a printing apparatus or in a printing system with data processing apparatuses arranged upstream or downstream. It is thereby clear that corresponding computers on which the preferred embodiment is applied can comprise further known technical devices such as input means (keyboard, mouse, touchscreen), a microprocessor, a data or control bus, a display device (monitor, display) as well as a working memory, a fixed disk storage and a network card.

Although preferred exemplary embodiments have been shown and described in detail in the drawings and in the preceding specification, these should be viewed as purely exemplary and not as limiting the invention. It is noted that only the preferred exemplary embodiments are presented and described, and all variations and modifications that presently and in the future lie within the protective scope of the invention should be protected.

I claim as my invention:

1. A data processing system, comprising:
a computer;
an administration operating system operating on said computer;
a plurality of operating systems to be automatically provided in succession to said computer for testing by said computer;
at least one test routine automatically executable by said computer by at least one of said test operating systems automatically provided by said administration operating system; and
said computer, by use of said administration operating system, automatically selecting one of the test operating systems from said list, automatically restarting the data processing system and automatically starting the selected test processing system which automatically executes said at least one test routine, and then said administration operating system automatically selecting a next of the test operating systems from said list, automatically restating the data processing system, and automatically starting the next selected test processing system which automatically executes said at least one test routine or another test routine.

2. A data processing system according to claim 1 wherein the at least one test routine calls an application program via which the data processing system provides a print server function, or the at least one test routine processes print data into a print data stream and transfers the print data to a test system connected with the data processing system, whereby a tree structure generates at least one raster image with aid of the transferred print data and advantageously compares said at least one raster image with a stored raster image.

3. A data processing system according to claim 1 wherein at least one of said test operating systems is in a first configuration and another of said test operating systems is in a second configuration and they are successively provided in a controlled manner by the administration operating system, whereby the test operating system configurations are established with aid of at least one respective configuration parameter.

4. A data processing system according to claim 1 wherein at least two of said test operating systems are provided that are successively provided by the administration operating system corresponding to their list entries in the list.

5. A data processing system according to claim 1 wherein at least the administration operating system determines test results of the at least one test routine, and at least outputs the test results, transfers said results as a message to a recipient, or outputs said results with aid of an output unit.

6. A data processing system according to claim 1 wherein at least the first selected test operating system is automatically ended after the execution of the test routine, and the administration operating system subsequently automatically checks whether the next test operating system to be selected is to be started.

7. A data processing system according to claim 1 wherein while the administration operating system is provided, it is checked whether a test operating system contained in the list has not yet been initialized, and the administration operating system configures the data processing system such that the test operating system that has not yet been initialized is automatically started after an automatic restart of the data processing system.

8. A data processing system according to claim 1 wherein while the administration operating system is provided, said restart of the data processing system is initiated, after which the selected data processing system has been reconfigured such that, after the restart of the data processing system, the selected test operating system specified in the list is provided; and while the selected test operating system is provided, the restart of the data processing system is initiated after the test routine has been ended or interrupted for the selected data processing system.

9. A data processing system according to claim 1 wherein at least the selected test operating system is configured such that an updating of the selected test operating system is implemented when update data for updating of the program data of the selected test operating system are available, or in that the test routine is automatically started only when the program data of the selected test operating system is updated or program data of an application program to be processed under the selected test operating system have been changed.

10. A data processing system according to claim 9 wherein the administration operating system saves the program data of the updated selected test operating system.

11. A data processing system according to claim 1 wherein after the execution of the at least one test routine, after an unsuccessful call of the at least one test routine or after an interruption of the at least one test routine, the selected test operating system configures the data processing system such that the administration operating system is provided again after a restart of the data processing system.

12. A data processing system according to claim 1 wherein the data processing system marks as processed or removes from the list a list entry of the test operating system to be selected.

13. A data processing system according to claim 8 wherein at least the selected test operating system configures the data processing system with the aid of a boot manager such that the administration operating system is provided, or in that the administration operating system configures the data processing system with aid of a boot manager such that the selected test operating system is subsequently initialized.

14. A data processing system according to claim 1 wherein the administration operating system or an application program executed under the administration operating system automatically starts the processing of the list at a preset time.

15. A data processing system according to claim 1 wherein the data processing system comprises at least three storage regions, at least program data or application data for provision of the test operating system to be selected are advantageously stored in a first storage region, at least program data or application data for provision of the administration operating system are stored in a second storage region, or at least program data or application data for provision of the next test operating system to be selected are stored in a third storage region, and with said test operating system at least the program data or application data required for provision of the test operating system to be selected in the first storage region are generated.

16. A data processing system according to claim 15 wherein the data stored in the third storage region serve for at least generation of the program data or application data to be stored in the first storage region for provision of the test operating system to be selected.

17. A method for execution of a test routine in connection with a test operating system, comprising the steps of:
providing a data processing system comprising a computer and an administration operating system operating on said computer;
providing a plurality of test operating systems and a list of said test operating systems to be automatically tested in succession by said computer;
providing at least one test routine;
with said administration operating system, automatically selecting from said list one of said test operating systems;
automatically starting said selected test operating system which then automatically runs the test routine;
with said administration operating system automatically selecting another test operating system from said list; and
with said administration operating system, automatically restarting said data processing system and automatically starting the newly selected test operating system which then automatically runs said test routine or another test routine.

18. A data processing system, comprising:
a computer;
an administration operating system operating on said computer;
a plurality of operating systems to be automatically provided in succession to said computer for testing by said computer;
at least one test routine automatically executable by said computer by at least one of said test operating systems automatically provided by said administration operating system; and
said computer, by use of said administration operating system, automatically selecting one of the test operating systems from said list and automatically starting the selected test processing system which automatically executes said at least one test routine, and then said administration operating system automatically selecting a next of the test operating systems from said list and automatically starting the next test processing system which automatically executes said at least one test routine or another test routine.

19. A method for execution of a test routine in connection with a test operating system, comprising the steps of:
providing a data processing system comprising a computer and an administration operating system operating on said computer;
providing a plurality of test operating systems and a list of said test operating systems to be automatically tested in succession by said computer;
providing at least one test routine;
with said administration operating system, automatically selecting from said list one of said test operating systems;
automatically starting said selected test operating system which then automatically runs the test routine;
with said administration operating system automatically selecting another test operating system from said list; and
with said administration operating system, automatically starting the newly selected test operating system which then automatically runs said test routine or another test routine.

* * * * *